United States Patent [19]

Sasaki et al.

[11] Patent Number: 5,461,514
[45] Date of Patent: Oct. 24, 1995

[54] REFLECTOR DEVICE

[75] Inventors: Aki Sasaki; Izumi Mikami, both of Hyogo, Japan

[73] Assignee: Mitsubishi Denki Kabushiki Kaisha, Tokyo, Japan

[21] Appl. No.: 101,100

[22] Filed: Aug. 3, 1993

Related U.S. Application Data

[63] Continuation of Ser. No. 710,797, Jun. 5, 1991, abandoned.

[30] Foreign Application Priority Data

Aug. 15, 1990 [JP] Japan .................................. 2-215510
Nov. 26, 1990 [JP] Japan .................................. 2-324244
Feb. 5, 1991 [JP] Japan .................................. 3-035270

[51] Int. Cl.$^6$ ........................................ G02B 5/08
[52] U.S. Cl. .................................... 359/848; 359/846
[58] Field of Search ............................ 359/838, 846, 359/847, 848, 849

[56] References Cited

U.S. PATENT DOCUMENTS

| | | | |
|---|---|---|---|
| 4,825,062 | 4/1989 | Rather et al. | 359/849 |
| 4,944,580 | 7/1990 | MacDonald et al. | 359/849 |
| 4,959,531 | 9/1990 | Marino | 359/849 |
| 4,993,823 | 2/1991 | Schaffer, Jr. et al. | 359/849 |
| 5,109,349 | 4/1992 | Ulich et al. | 359/849 |

OTHER PUBLICATIONS

Scott; "Electrooptics in Space Operation and Research", IEEE Spectrum; Jan. 1966 pp. 85–88.
Krim et al., "Accommodating CTE Discontinuities In a ULE Mosaic Mirror", Advanced Technology Optical Telescopes IV, 1990, pp. 605–614.

*Primary Examiner*—Ricky D. Shafer
*Attorney, Agent, or Firm*—Rothwell, Figg, Ernst & Kurz

[57] ABSTRACT

Described herein is a reflector which is formed of three or more of reflector modules (called stacks in followings) arranged in arrays and bonded to each other the stacks being arranged to average the distribution of thermal deformations thereof in terms of inhomogeneity among the stacks in average-coefficient of linear expansion, thereby suppressing deformation and deterioration of image-forming performance quality of the reflector under varying temperature conditions. Since the stacks are arranged in order of the magnitude of values of average coefficients of linear expansion possessed by said stacks so that a thermal deformation pattern produced is a relatively simple pattern, there is provided a reflector device in which correction of thermal deformation can be made by a few actuators. A reflector device wherein a correcting force is automatically calculated from a difference between a temperature of a reflector and a reference temperature to drive an actuator whereby an excellent image forming performance with respect to the change in temperature can be maintained. A reflector device wherein a surface deformation of a reflector is developed into modes to automatically select modes so that a residual deformation is less a predesignated deformation amount, and after correction thereof, the deformation is corrected whereby the correction can be made efficiently with a small force.

3 Claims, 11 Drawing Sheets

FIG.1
(PRIOR ART)
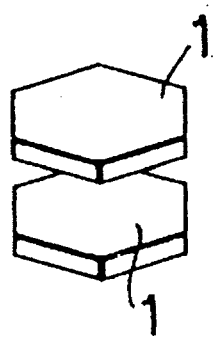
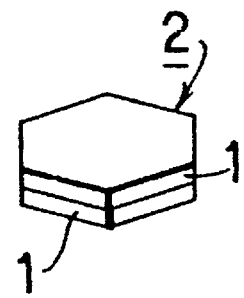
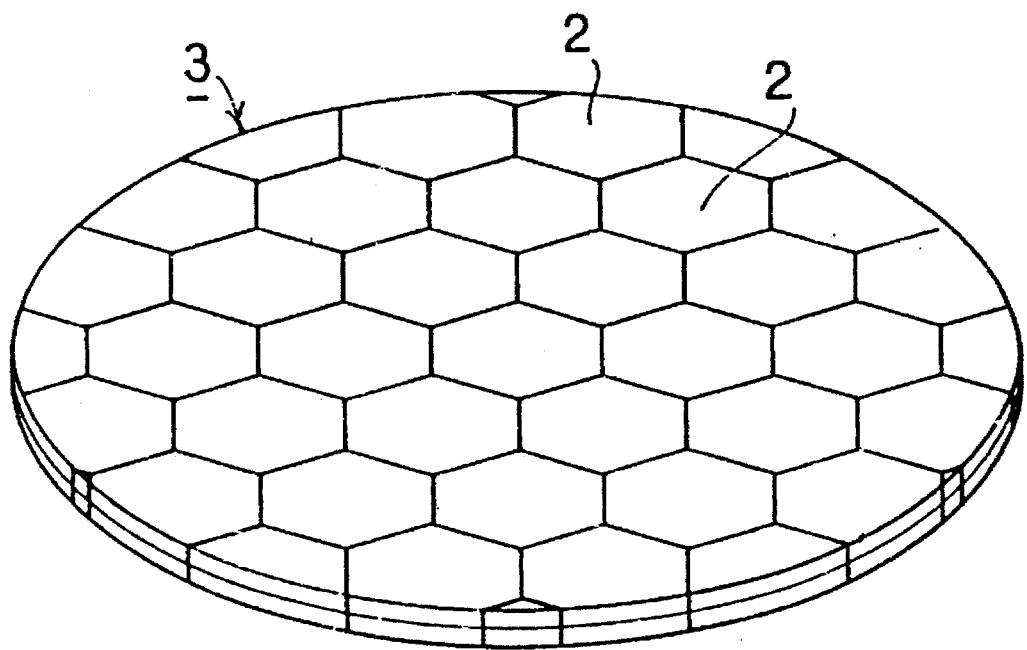

REFLECTOR DEVICE

This is a continuation of application Ser. No. 07/710,797, filed Jun. 5, 1991, now abandoned.

BACKGROUND OF THE INVENTION

Field of the Invention

This invention relates to reflector device for large-size reflection telescopes, and more particularly to shape control of such reflectors.

Description of the Prior Art

Schematically shown in FIG. 1 is a conventional reflector, in which the reference 1 denotes boules which are employed as a unit material in the fabrication of reflectors. A plural number of boules 1 are overlapped one on another and bonded together to make a stack 2, and a plural number of such stacks 2 are arranged to form a surface of a concave shape, for example, a parabolic or hyperbolic surface.

In operation, the surface of the reflector 3, which has undergone polishing of extremely high precision to provide a reflecting surface of a predetermined concave shape such as parabolic or hyperbolic shape, reflects electromagnetic waves from a celestial body such as visible light or infrared rays to form an image of the celestial body at its focal point.

In this instance, since the coefficient of linear expansion of each boule 1 is not zero, the reflector 3 is subject to thermal deformation under varying temperature conditions. If the reflector 3 is uniform in coefficient of linear expansion over its entire body, it undergoes thermal deformation into a similar shape, converging the electromagnetic waves from a celestial body toward a position of similarity with respect to the original focal point to form an image of the celestial body at that position. However, as a matter of fact the reflector 3 exhibits inhomogeneity in coefficient of linear expansion, so that the surface of the reflector 3 is distorted by thermal deformations attributable to such inhomogeneity, resulting in deteriorations in image-forming performance quality.

Therefore, it has been the conventional practice to measure the thickness-wise distribution of the coefficient of linear expansion of each boule 1 to determine its variation rate beforehand and to combine the boules according to the data of variation rate in such a manner as to put the mean variation rate close to zero. Namely, each stack 2 is formed of a combination of boules 1 which are considered to counteract in thermal deformation, thereby to reduce the thermal deformation of the stack 2.

A number of such stacks 2 are arranged randomly to form the reflector 3.

The conventional reflector 3 with the above-described construction, however, has a problem that the reflector as a whole undergoes considerably large thermal deformation due to localized inhomogeneity in coefficient of linear expansion in the entire body of the reflector 3, which are caused by inhomogeneity among the stacks 2 in variation rate of the coefficient of linear expansion remaining in the thickness-wise direction or due to inhomogeneity among the stacks 2 in average coefficient of linear expansion.

SUMMARY OF THE INVENTION

The present invention contemplates to solve the above-mentioned problems, and has as its first object the provision of a reflector which is less susceptible to thermal deformation under varying temperature conditions to ensure improved image-forming performance quality.

It is a second object of the present invention is to provide a reflector device in which thermal deformation caused by a change in temperature can be corrected by a small number of actuators.

It is a third object of the present invention to provide a reflector device capable of correcting a mirror surface deformation up to a sufficient degree with a small correcting force and having a high durability against a noise of the measured data of mirror surface deformation.

According to an aspect of the present invention, there is provided, for achieving the above-stated first objective, a reflector which is composed of stacks arranged to average the distribution of thermal deformations in terms of inhomogeneity among the stacks in average coefficient of linear expansion.

According to a second aspect of the present invention, there is provided a reflector composed of three groups of stacks, i.e., a first group of stacks of relatively large thermal deformation in terms of inhomogeneity in average coefficient of linear expansion, a second group of stacks of average thermal deformation, and a third group of stacks of relatively small thermal deformation, the stacks of the second and third groups being arranged to surround each one of the stacks of the first group of relatively large thermal deformation.

According to a third aspect of the present invention, there is provided a reflector composed of stacks arranged to average the distribution of thermal deformations in terms of inhomogeneity among the stacks in thickness-wise variation rate of the coefficient of linear expansion.

According to a fourth aspect of the present invention, there is provided a reflector composed of three groups of stacks, i.e., a first group of stacks of relatively large thermal deformation in terms of inhomogeneity in thickness-wise variation rate of the coefficient of linear expansion, a second group of stacks of average thermal deformation, and a third group of stacks of relatively small thermal deformation, the stacks of the second and third groups of average and relative small thermal deformations being arranged to surround each one of the stacks of the third group of relatively large thermal deformation.

According to a fifth aspect of the present invention, there is provided a reflector composed of stacks arranged to average the distribution of thermal deformations in terms of inhomogeneity among the stacks both in average coefficient of linear expansion and in thickness-wise variation rate of the coefficient of linear expansion.

According to a sixth aspect of the present invention, there is provided a reflector composed of three groups of stacks, i.e., a first group of stacks having relatively large thermal deformation in terms of inhomogeneity both in average coefficient of linear expansion and in thickness-wise variation rate of the coefficient of linear expansion, a second group of stacks having average thermal deformation, and a third group of stacks having relatively small thermal deformation, the stacks of the second and third groups of average and relative small thermal deformations being arranged to surround each one of the stacks of the third group of relatively large thermal deformation.

In order to accomplish the aforesaid second object of the present invention, the reflector device constructed in accordance with the seventh aspect of the present invention is designed so that average coefficient of linear expansion is measured in advance, and stacks are disposed adjacent to one another in order of great average coefficient of linear expansion such that the stacks are disposed in a spiral manner or in a line manner from one end to the other and from the line to the next line to constitute a reflector, and thermal deformation produced in the reflector is corrected by the driving of actuators provided on the back surface of the reflector.

A reflector device according to an eighth aspect of this invention is designed so that thickness-wise variation rate is measured in advance from the thickness-wise distribution of coefficient of linear expansion of each stack, and stacks are disposed adjacent to one another in order of the magnitude of thickness-wise variation rate such that the stacks are disposed in a spiral manner or in a line manner from one end to the other and from the line to the next line to constitute a reflector, and thermal deformation produced in said reflector is corrected by the driving of a plurality of actuators provided on the back surface of the reflector.

A reflector device according to a ninth aspect of this invention is designed so that stacks are arranged according to coefficients of linear expansion thereof to constitute a reflector, memory means is provided to store a predetermined temperature when the reflector represents a predetermined shape and store a correcting force to be applied to a plurality of actuators provided on the back surface of the reflector when a difference between said predetermined temperature and a temperature of said reflector is one degree, a difference in temperature between a temperature of the reflector measured by temperature measuring means and a predetermined temperature from said memory means is calculated, a correcting force with respect to the temperature difference is calculated by calculation means in response to the correcting force from said memory means, and said correcting force is applied to the actuators to drive the actuators to correct thermal deformation of the reflector.

A reflector device according to a tenth aspect of this invention for achieving the aforesaid third object comprises deformation measuring means for measuring deformation of the surface of a reflector and a plurality of actuators for correcting the deformation, whereby the deformation of the surface of the reflector is developed in mode from said measured deformation amount by calculation means to select, in a predetermined order, modes to be corrected so that residual deformation is less than a predesignated deformation amount and calculate a correcting force, said correcting force being applied to the corresponding actuator to drive the actuators, thus correcting deformation of the reflector.

The reflector device constructed in accordance with the eleventh aspect of the present invention is operated such that a correction mode on a surface deformation of the reflector is defined in advance and an actuator is arranged at a selected position where the most efficient correction is carried out for the corrected mode.

The above and other objects, novel features and advantages of the invention will become apparent from the following description and the appended claims, taken in conjunction with the accompanying drawings, which are given for the purpose of illustration only and therefore should not be construed as being limitative of the invention in any way whatsoever.

BRIEF DESCRIPTION OF THE DRAWINGS

In the accompanying drawings:

FIG. 1 is a schematic view of a conventional reflector.

DETAILED DESCRIPTION OF THE PREFERRED EMBODIMENTS

Figure 2:
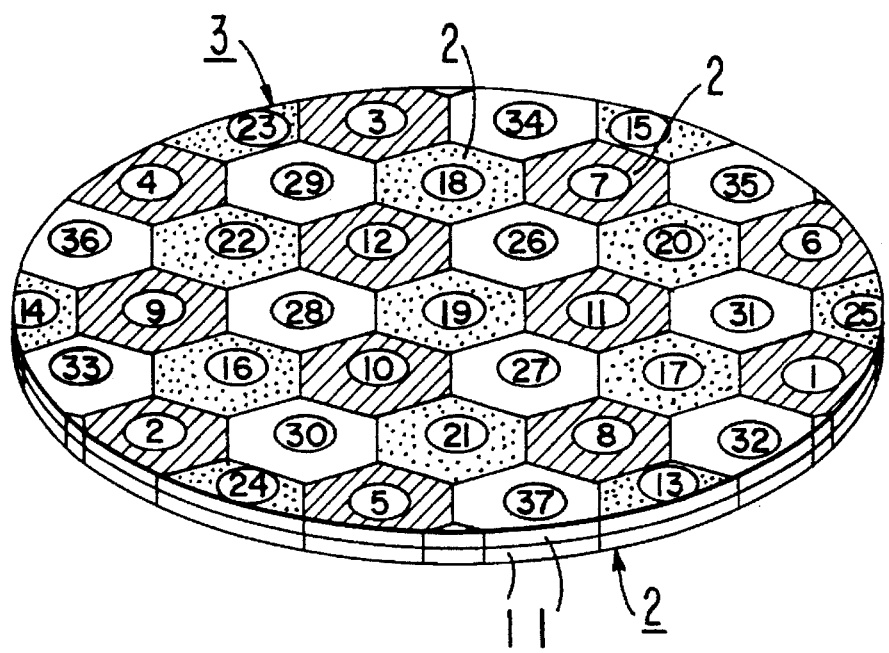
FIG. 2 is a perspective view for showing the reflector device constructed in accordance with the first preferred embodiment of the present invention.

Hereafter, the invention is described more particularly by way of the preferred embodiments shown in the drawings. In FIG. 2, indicated at 1 are boules, at 2 are stacks and at 3 is a reflector formed of thirty-seven stacks 2 which are arranged in arrays and each bonded to adjacent stacks. The stacks are allotted with numbers 1 to 37 in the order to the extent of thermal deformation in terms of the average coefficient of linear expansion. More specifically, the stacks which are allotted with numbers 1 to 12 and indicated by cross-hatching fall in a first group of relatively large thermal deformation in terms of average coefficient of linear expansion, the stacks which are allotted with numbers 13 to 25 and indicated by dots fall in a second group of average thermal deformation, and the stacks which are allotted with numbers 26 to 37 fall in a third group of relatively small thermal deformation.

In arranging the stacks 2 of the respective groups, they are arrayed such that each one of the stacks of the first group of relatively large thermal deformation is surrounded by the stacks of the second group of average thermal deformation and by the stacks of the third group of relatively small thermal deformation. The thirty-seven stacks which are arrayed in this manner are bonded to adjacent stacks to form the reflector 3.

Turning now to the operation of the reflector, those points which are common with the conventional reflector are omitted from the description, including the image-forming operation of the reflector 3, the deteriorations of the image-forming performance quality as caused by thermal deformations due to inhomogeneity in coefficient of linear expansion, and the formation of stacks by the use of a combination of boules 1 which counteract in thermal deformation.

Although the stacks 2 are formed of a combination of boules 1 which counteract in thermal deformation, there still remain thickness-wise distribution of the coefficient of linear expansion in each stack 2 and there are inhomogeneity among stacks 2 in thickness-wise variation rate of the coefficient of linear expansion. Inhomogeneity also exist among the stacks 2 in average coefficient of linear expansion. In case thermal deformations due to these inhomogeneity are distributed unevenly over the entire body of the reflector 3, the reflector 3 undergoes considerable thermal deformation as a whole. On the other hand, in case of even distribution, the thermal deformations takes place in restricted localities, minimizing the extent of deformation of the reflector as compared with the unevenly distributed deformations.

Figure 3A:
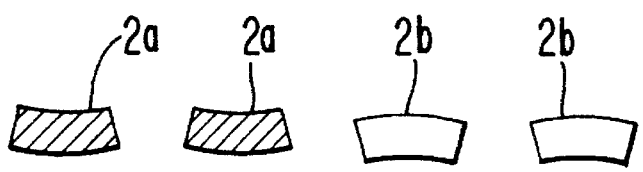
FIGS. 3(a)–3(c) is an illustrative view for showing schematically an amount of deformation of the reflector device caused by a displacement of thermal deformation in a stack.
Figures 3B, 3C:
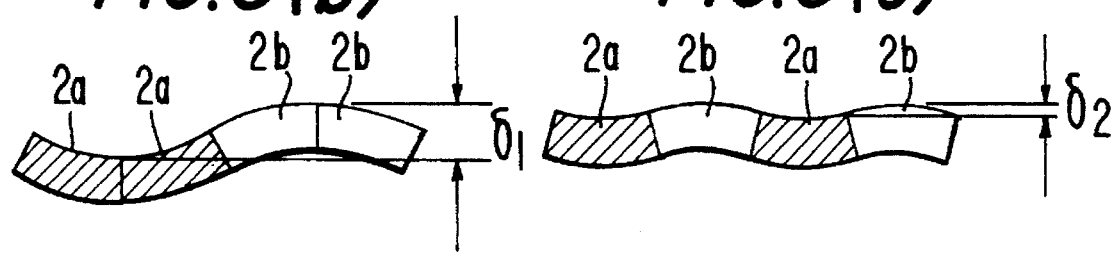

These even and uneven distributions are schematically shown in FIG. 3. Let us assume that, as shown in FIG. 3, there are stacks 2a which deform into a downwardly convex shape and stacks 2b which deform into an upwardly convex shape. In case the stacks 2 are distributed unevenly as shown in FIG. 3(b), the reflector may contain two or more downwardly convex stacks 2a in consecutively connected state side by side with two or more upwardly convex stacks 2b which are also connected consecutively, deforming the entire body of the reflector 3 to an extent as indicated by $\delta_1$. On the other hand, in case the stacks 2a and 2b are arranged alternately, the deformation is localized and reduced to an amount $\delta_2$ which is smaller than the aforementioned value $\delta_1$.

In this embodiment, considering the inhomogeneity among the stacks 2 in average coefficient of linear expansion, the stacks 2 are arrayed such that each stack 2 of the group with a large average coefficient of linear expansion is surrounded by three stacks 2 of the group of average thermal deformation and three stacks 2 of the group of small thermal deformation. Consequently, the large thermal expansion of the centrally positioned stack 2 is moderated by the surrounding stacks 2 of smaller thermal deformation, thereby localizing the thermal deformation of the reflector and reducing same to a degree far smaller than that of the uneven stack distribution.

Further, in the above-described embodiment, the stacks are classified into three groups according to the thermal deformations due to inhomogeneity in average coefficient of linear expansion, arranging stacks of the groups of average and small thermal deformations around a stack of the group of relatively large thermal deformation. However, it is to be understood that similar effects can be obtained from other stack arrangements based on the above-discussed uniform distribution of thermal deformation.

Although the stacks 2 are distributed evenly in terms of inhomogeneity among stacks in average coefficient of linear expansion in the foregoing embodiment, the grouping and distribution of the stacks may be based on thickness-wise variation rate in the coefficient of linear expansion which contributes to the thermal deformation of each stack in a case where large thermal deformation takes place due to inhomogeneity in the thickness-wise variation rate in coefficient of linear expansion. In such a case, similarly to the foregoing embodiment, the thermal deformation of the reflector can be suppressed by evenly distributing the stacks of the respective groups.

Likewise, in a case where the thermal deformation due to inhomogeneity in average coefficient of linear expansion and the thermal deformation due to inhomogeneity in thickness-wise the variation rate in coefficient of linear expansion have almost the same influence, the stacks may be arranged in a manner to the foregoing embodiment to distribute the thermal deformations evenly on the basis of both of these factors for suppression of thermal deformation of the reflector.

As clear from the foregoing description, according to the first and second aspects of the invention, the respective stacks are arranged in such a manner as to avoid uneven distribution of thermal deformation due to inhomogeneity in average coefficient of linear expansion, so that it becomes possible to minimize the absolute value of the thermal deformation of the reflector as a whole despite the increased number of small deformations, permitting to make the reflector less susceptible to detrimental deformations and to deteriorations in image-forming performance quality under varying temperature conditions.

According to the third and fourth aspect of the invention, the respective stacks are arranged in such a manner as to avoid uneven distribution of thermal deformation due to inhomogeneity in thickness-wise variation rate in coefficient of linear expansion to minimize the absolute value of the thermal deformation of the reflector as a whole despite the increased number of small deformations, permitting to make the reflector less susceptible to detrimental deformations and to deteriorations in image-forming performance quality under varying temperature conditions.

According to the fifth and sixth aspects of the invention, the respective stacks are arranged in such a manner as to avoid uneven distribution of thermal deformations due to inhomogeneity both in average coefficient of linear expansion and in thickness-wise variation rate in coefficient of linear expansion to minimize the absolute value of the thermal deformation of the reflector as a whole despite the increased number of small deformations, permitting to make the reflector less susceptible to detrimental deformations and to deteriorations in image-forming performance quality under varying temperature conditions.

One embodiment of a reflector device provided with actuators for correcting thermal deformation will be described hereinafter.

Figure 4A:
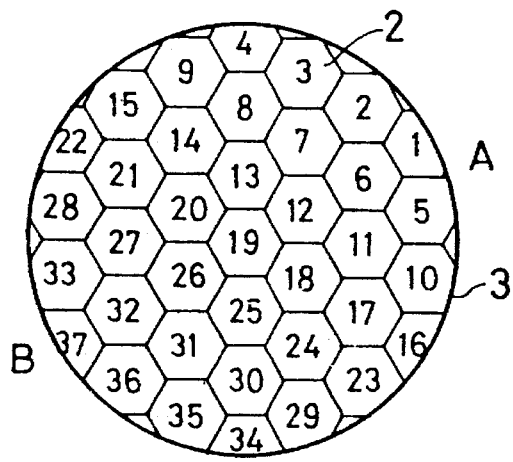
FIGS. 4(a)–4(e) is a plan view of a reflector showing the arranging method of stacks according to one embodiment of this invention.
Figure 4B:
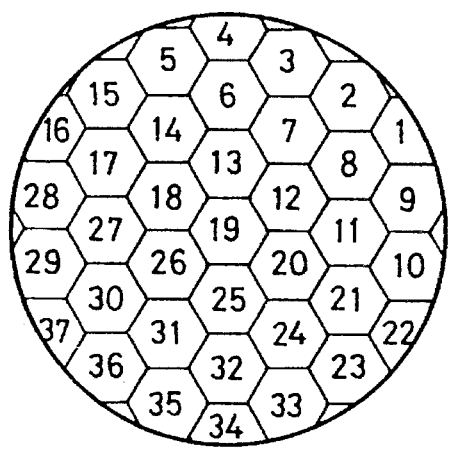

In FIGS. 4(a) and 4(b), stacks are arranged in a line manner from one end to the other in order of great rate of thickness-wise change of coefficients of linear expansion to constitute a reflector 3. Numerical numbers shown in FIGS. 4(a) and 4(b) designate orders of values of rate of thickness-wise change of coefficients of linear expansion of stacks.

Figure 4C:
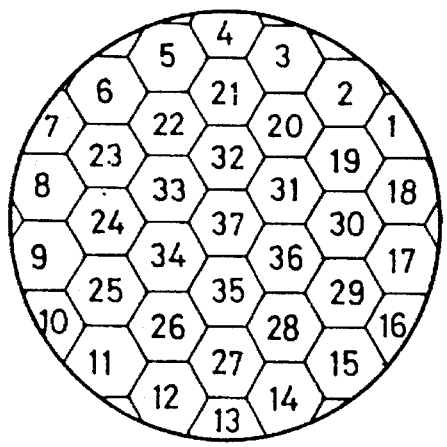
Figure 4D:
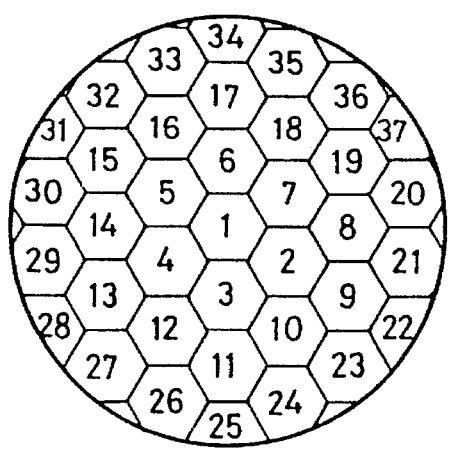
Figure 4E:
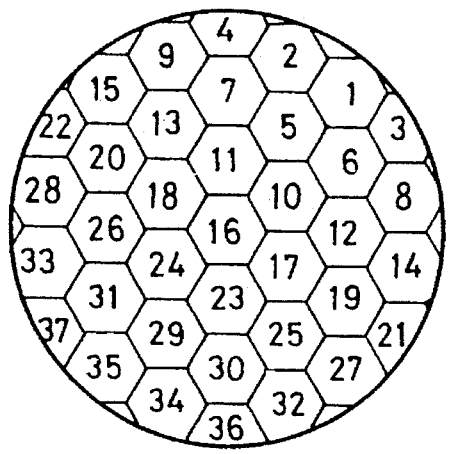

In FIGS. 4(c) and 4(d), stacks are arranged in order of magnitude of values of rate of thickness-wise change of coefficients of linear expansion from the peripheral edge to the center and vice versa. An alternative manner of arrangement is also contemplated as shown in FIG. 4(e).

When a reflector is constituted by arrangement shown in FIGS. 4(a) to 4(e) in order of magnitude of values of rate of thickness-wise change of coefficients of linear expansion of stacks 2, and thermal deformation is extremely gently to form a relatively simple pattern.

Figure 5A:
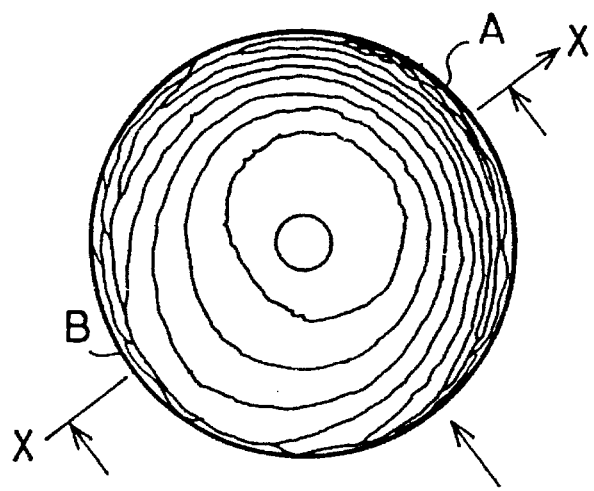
FIGS. 5(a)–5(b) is a contour-line diagram showing one example of thermal deformation of a reflector.
Figure 5B:
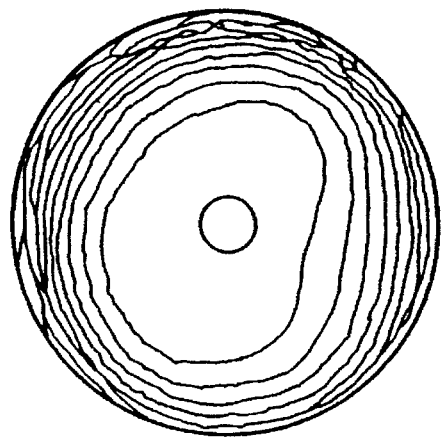

For example, in case of arrangement as in FIG. 4(a), its deformation pattern is as in FIG. 5(a). In case of arrangement as in FIG. 4(c), its deformation pattern is as in FIG. 5(b). FIGS. 5(a) and 5(b) are respectively contour-line diagrams in which points whose deformation amounts $\Delta Z$ at respective points of a reflector 3 are equal are connected.

Figure 6:
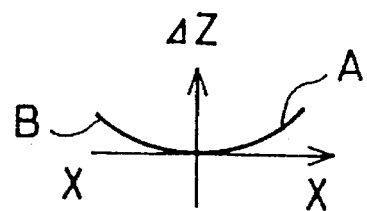
FIG. 6 is a sectional view with thermal deformation of a reflector shown in FIG. 5(a) broken in line X—X.

In FIG. 5(a), a contour-line is high in density in one peripheral edge of a reflector 3 while low in density in the opposite peripheral edge. In FIG. 5 (b), the density in a peripheral edge of a reflector 3 is high, and the density in a central portion is low. For example, a sectional shape of deformation of a reflector broken in line X—X in FIG. 5 (a) is as shown in FIG. 6.

In this manner, by the arrangement of stacks 2 as shown in FIGS. 4(a) to 4(e), the whole thermal deformation of a reflector 3 comprises a relatively simple pattern. In the case where thermal deformation of the reflector 3 is corrected by applying a force to the reflector 3 using actuators, a few numbers of actuators will suffice.

Figure 7A:
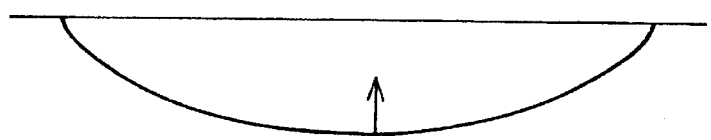
FIGS. 7(a)–7(b) is an illustrative view showing thermal deformation of a reflector.
Figure 7B:
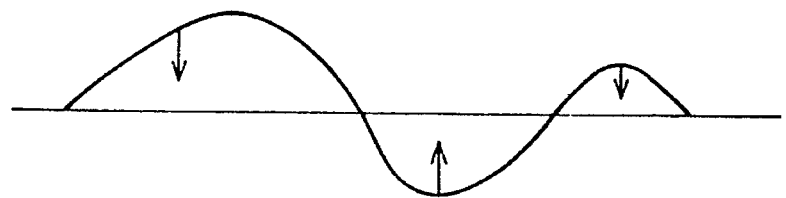

That is, as will be apparent from comparison between the case where thermal deformation of a reflector 3 has a relatively simple pattern as shown in FIG. 7 (a) and the case where it is not so as shown in FIG. 7(b), more complicated thermal deformation pattern, a large number of actuators are necessary. FIGS. 7 (a) and 7 (b) show sectional shapes of deformation of the whole reflector 3.

While in the foregoing, the case has been described where deformation caused by inhomogeneity of rate of thickness-wise change of coefficients of linear expansion is greater than deformation caused by inhomogeneity of average coefficients of linear expansion, the same is true for the reverse case.

According to the seventh and eighth aspects of the present invention, stacks are arranged in order of magnitude of average coefficients of linear expansion or rate of thickness-wise change of coefficients of linear expansion to constitute a reflector so that the produced thermal deformation pattern is a relatively simple pattern. Therefore, there is an effect capable of obtaining a reflector device in which thermal deformation can be corrected a few numbers of actuators.

Figure 8:
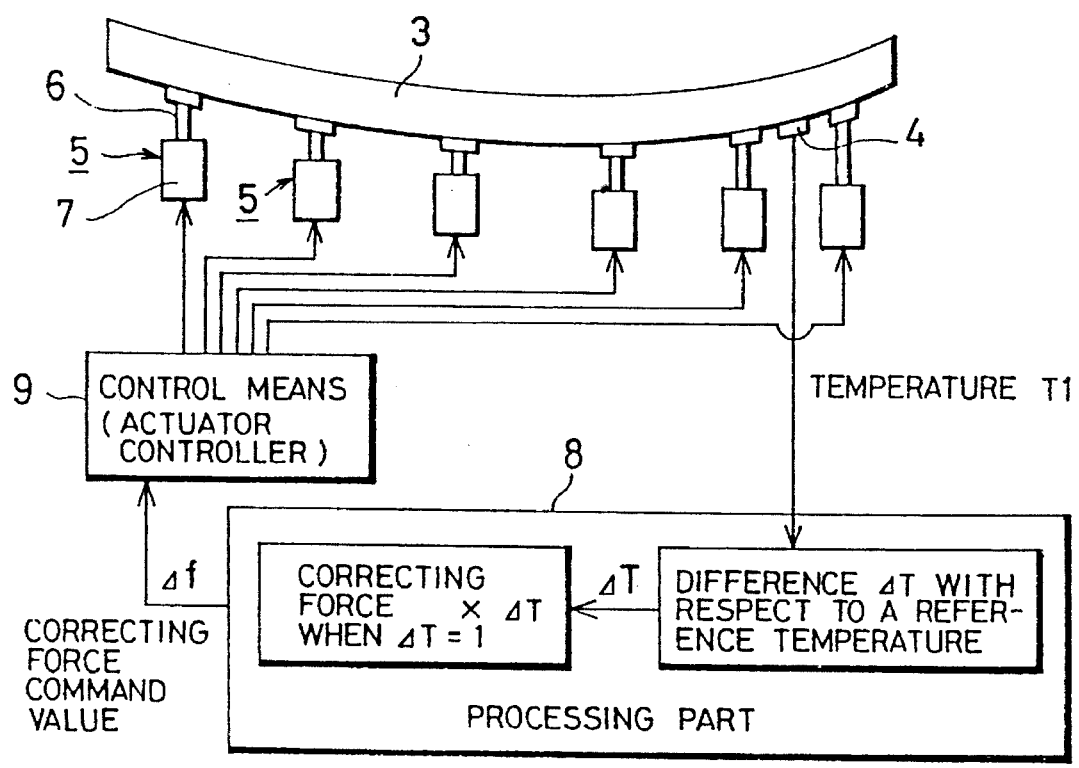
FIG. 8 is a configuration view showing one embodiment of this invention.

Next, an embodiment concerning the correction of thermal deformation of a reflector will be described. FIG. 8 is a configuration view showing this embodiment.

In this figure, reference numeral 3 designates a reflector. A plurality of stacks 2 are arranged, paying attention to the rate of change when a thickness-wise distribution of coefficients of linear expansion is linearly approximated, in order of magnitude of the rate of change, for example, as shown in either of FIGS. 4(a) to 4(e) to constitute a predetermined concave surface shape. Reference numeral 4 denotes a temperature sensor as a temperature measuring means provided on the back surface or in the vicinity of the reflector 3. Reference numeral 5 denotes an actuator having a drive shaft 6 whose one end is secured to the back surface of the reflector 3, the drive shaft 6 being expanded by a drive part 7 to apply a force to the reflector 3. Reference numeral 8 denotes a processing part. Reference numeral 9 denotes an actuator controller as a control means which supplies a correcting force command value from the processing part 8 to the corresponding actuator 5 to drive the actuator 5.

Figure 9:
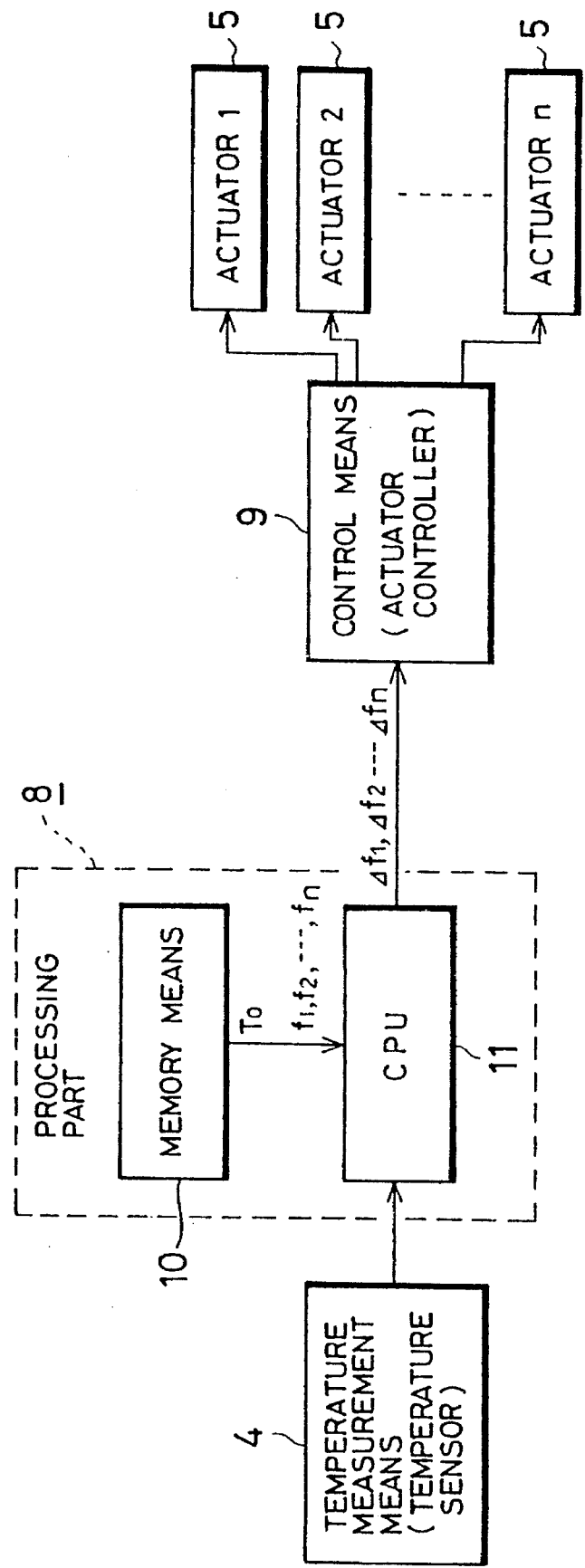
FIG. 9 is a block diagram showing a configuration of a processing part.
Figure 10:
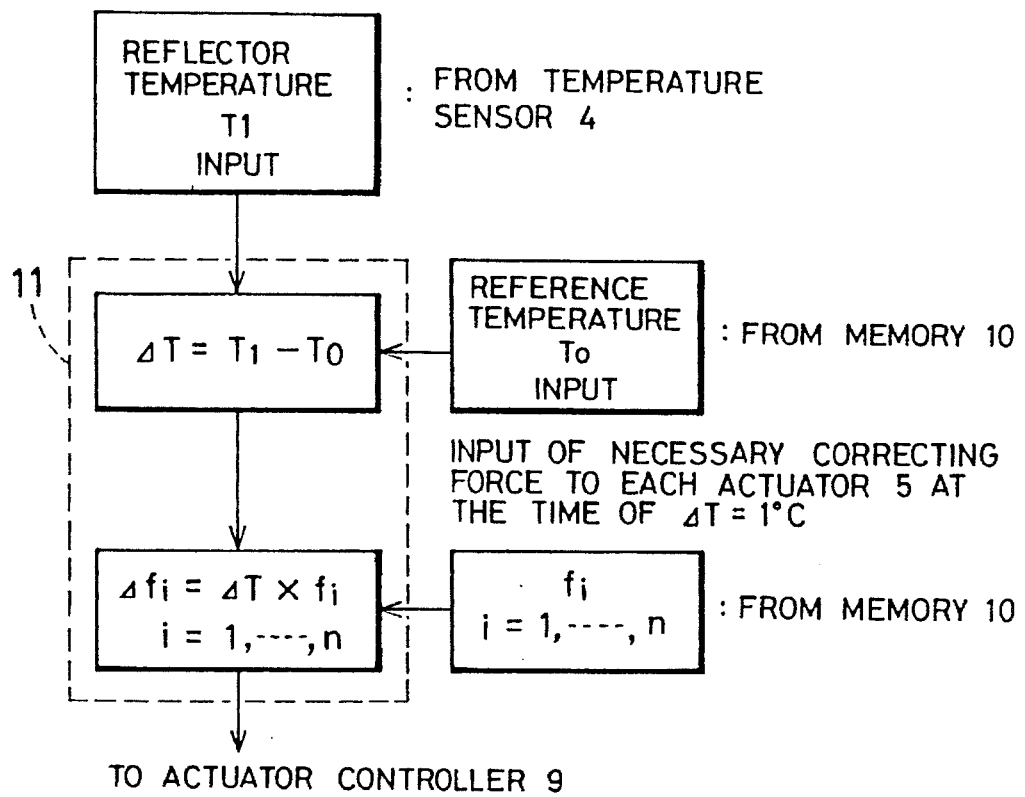
FIG. 10 is a flow chart showing processing of the processing part.
Figure 11:
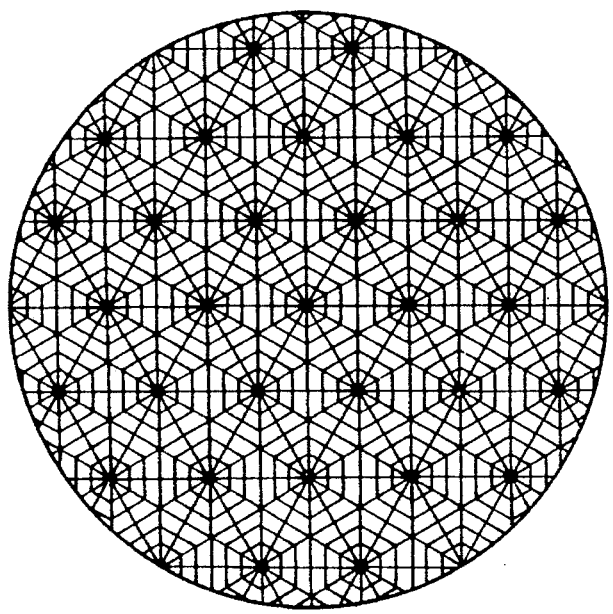
FIG. 11 is an illustrative view for illustrating a finite element process.

FIG. 9 is a block diagram including the processing part 8 used in the aforesaid embodiment. FIG. 10 is a flow chart. In these FIGS. 9 and 10, reference numeral 10 denotes a memory as memory means, and 11 is a CPU as calculation means. The processing part 8 includes the memory 10 and CPU 11.

The memory 10 stores a reference temperature $T_0$ when the reflector 3 presents a predetermined concave surface shape, that is, an ideal a parabola or hyperbola, and stores, corresponding to each actuator 5, a correcting force command value, $f_1, f_2, \ldots, f_n$, to be applied to each actuator 5 in correcting the thermally deformed reflector 3 to a predetermined concave surface shape when a difference in temperature $\Delta T$ between said reference temperature $T_0$ and the temperature of the reflector 3 is 1° C.

The correcting force values which are stored in memory 10 are calculated as follows: The coefficient of linear expansion of each stack is measured in advance when the plurality of stacks 2 are manufactured, and a model of a reflector is prepared with the aforementioned arrangement on the basis of these coefficients of linear expansion whereby a correcting force command value to be applied to each actuator 5 is obtained when a temperature difference $\Delta T$ is 1° C. by a finite element method in advance as will be described later.

In CPU 11, the temperature $T_1$ of the reflector 3 is input from the temperature sensor 4, the reference temperature $T_0$ is input from the memory 10, and the temperature difference $\Delta T$ is calculated as shown in FIG. 10. The correcting force values $f_1, f_2, \ldots, f_n$ corresponding to $\Delta T=1°$ C. are input from the memory 10 and the command values of the correcting forces with respect to the actuators $\Delta f_1, \Delta f_2, \ldots, \Delta f_n$, are calculated by the following formula to output them to the actuator controller 9.

$$\Delta f_i = \Delta T \times f_i$$
$$(i = 1, 2, \ldots n)$$

On the other hand, the actuator controller 9 receives the command value $\Delta f_i$ of the correcting force supplied from the CPU 11, judges to which actuator 5 is applied the command value $\Delta f_i$, and supplies the command value $\Delta f_i$ corresponding to the actuator 5. In this judgement, an address may be applied to the command value $\Delta f_i$, and the address may be discriminated to select the corresponding actuator 5.

The command values are transmitted to the drive parts 7 of the actuators 5, respectively. For example, a current according to the command value is caused to flow, and a correcting force corresponding to the command value is generated by an electromagnetic force to apply the force to the reflector 3.

Here, a description will be made of a process for obtaining correcting forces $f_1, f_2, \ldots, f_n$ stored in the memory, using a finite element method. If coefficients of linear expansion of stacks 2 constituting the reflector 3 are known, amounts of thermal deformation at any points of the reflector with respect to any change in temperature can be computed by use of the finite element method.

The finite element method is a method such that it divides a mirror surface into a number of fine elements to apply various property values such as Young modulus, Poisson's ratio, coefficients of linear expansion and so on and loads to compute deformation, and finally can obtain displacements of elements at apexes (lattice points).

On the other hand, besides the foregoing, according to the finite element method, a matrix (stiffness matrix) for connecting a load applied to an actuator point and an amount of deformation at the actuator point can be computed. This relationship can be represented by the following formula:

$$\begin{vmatrix} \Delta Z_1 \\ \Delta Z_2 \\ \cdot \\ \cdot \\ \cdot \\ \Delta Z_n \end{vmatrix} = K \cdot \begin{vmatrix} f_1 \\ f_2 \\ \cdot \\ \cdot \\ \cdot \\ f_n \end{vmatrix}$$

wherein $\Delta Z_1, \Delta Z_2, \ldots, \Delta Z_n$ represent the displacement at the actuator point, $f_1, f_2, \ldots, f_n$ represent the loads applied to the respective actuator points, and K the stiffness matrix of size nxn.

When an inverse matrix $K^{-1}$ of a stiffness matrix obtained by computation is used, a load required to produce deformation can be obtained from an amount of deformation as in the following formula.

$$\begin{vmatrix} f_1 \\ f_2 \\ \cdot \\ \cdot \\ \cdot \\ f_n \end{vmatrix} = K^{-1} \cdot \begin{vmatrix} \Delta Z_1 \\ \Delta Z_2 \\ \cdot \\ \cdot \\ \cdot \\ \Delta Z_n \end{vmatrix}$$

Substituting an amount of thermal deformation produced at the time of the temperature difference $\Delta T=1°$ C. computed in advance by the finite element method in $\Delta Z_j$ of the right side of the above-described formula gives the forces $f_1, f_2, \ldots, f_n$ required to produce such a deformation. Thereby, the $f_1, f_2, \ldots, f_n$ in the opposite direction are the correcting forces required to offset the thermal deformation In this manner, the correcting forces to be applied to the actuators are obtained at the time of $\Delta T=1°$ C., and stored in the memory 10.

As described above, according to the ninth aspect of the present invention, the correcting forces to the actuators are automatically calculated on the basis of difference between the detected temperature of the reflector and the reference temperature so as to correct the thermal deformation of the reflector. Therefore, even if it is installed in an area where a severe change in temperature takes place, it is possible to always maintain a predetermined shape, thus obtaining the effect capable of obtaining a reflector device which can effectively reduce a spreading of an image caused by thermal deformation of the reflector.

Next, the correction of a surface deformation of whole reflector including a deformation caused by those other than heat will be described.

Figure 12:
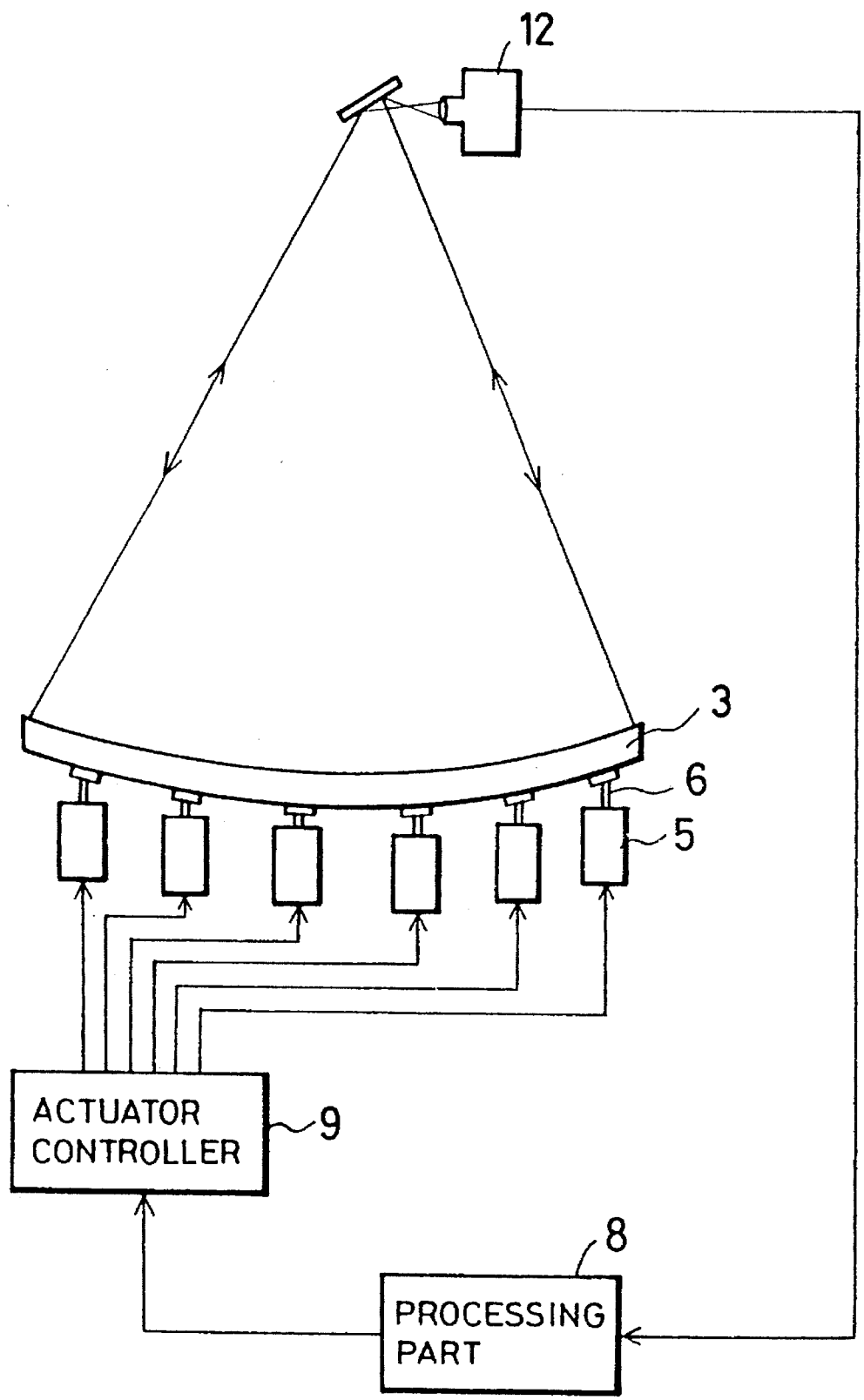
FIG. 12 is a configuration view showing one embodiment of this invention.

FIG. 12 is a configuration view showing this embodiment. In FIG. 12, reference numeral 3 designates a reflector, 5 an actuator, 8 a processing part including a memory 10 and a CPU 11 as calculation means, and 9 an actuator controller as control means, which are identical with or those corresponding to parts indicated by the same reference numerals in FIG. 8 and therefore will not be further described. Reference numeral 12 designates a mirror surface deformation measuring device as deformation measuring means for measuring deformations at respective points on the surface of the reflector 3 by detecting an interference of light or deviation of reflecting light.

Next, the operation will be described.

Figure 13:
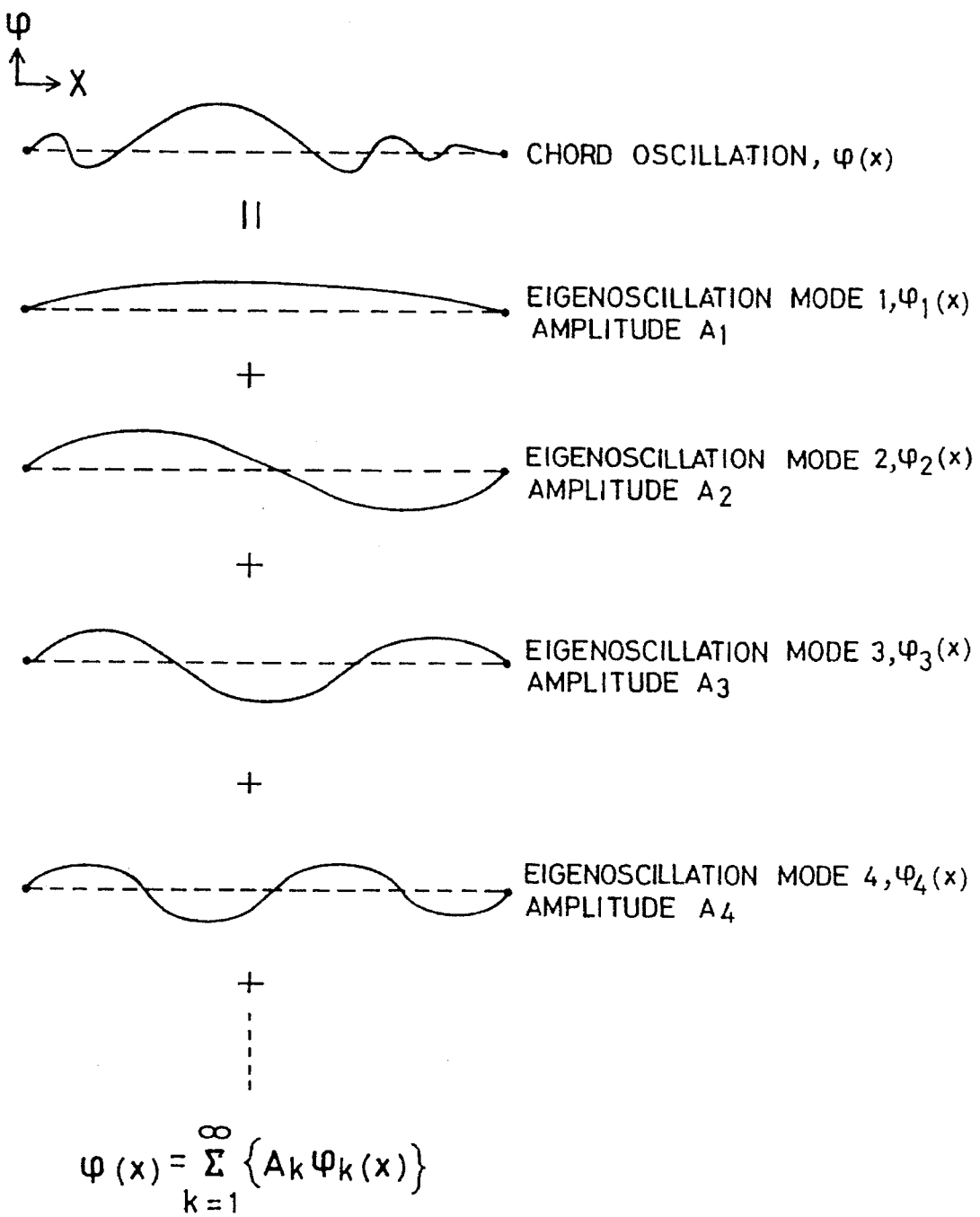
FIG. 13 is an illustrative view for showing a development in an eigenoscillation mode in a chord vibration.

At first, a mode development of the surface deformation of the reflector will be described. As well known in the art, it is possible to assume that a chord oscillation is expressed as sum of eigenoscillation modes. FIG. 13 illustrates a chord oscillation and its eigenoscillation mode. In this way, each of the modes $\phi_k(x)$, $k=1 \ldots$, and amplitude $A_k$, $k=1 \ldots$, are calculated and a chord oscillation $\phi(x)$ is expressed in a form of sum of these element, i.e.

$$\phi(x) = \sum_{k=1}^{\infty} \{A_k \cdot \phi_k(x)\}$$

and this is defined that a chord oscillation is developed in mode.

A mode development for a surface deformation can be similarly considered. As the modes to be applied for the development, there are Zernike series, two dimensional Fourier series, series of infinite term or finite term expressed by a function of a spatial frequency and an eigenoscillation mode or the like. In this case, an example of development with the eienoscillation mode will be described.

Figure 14:
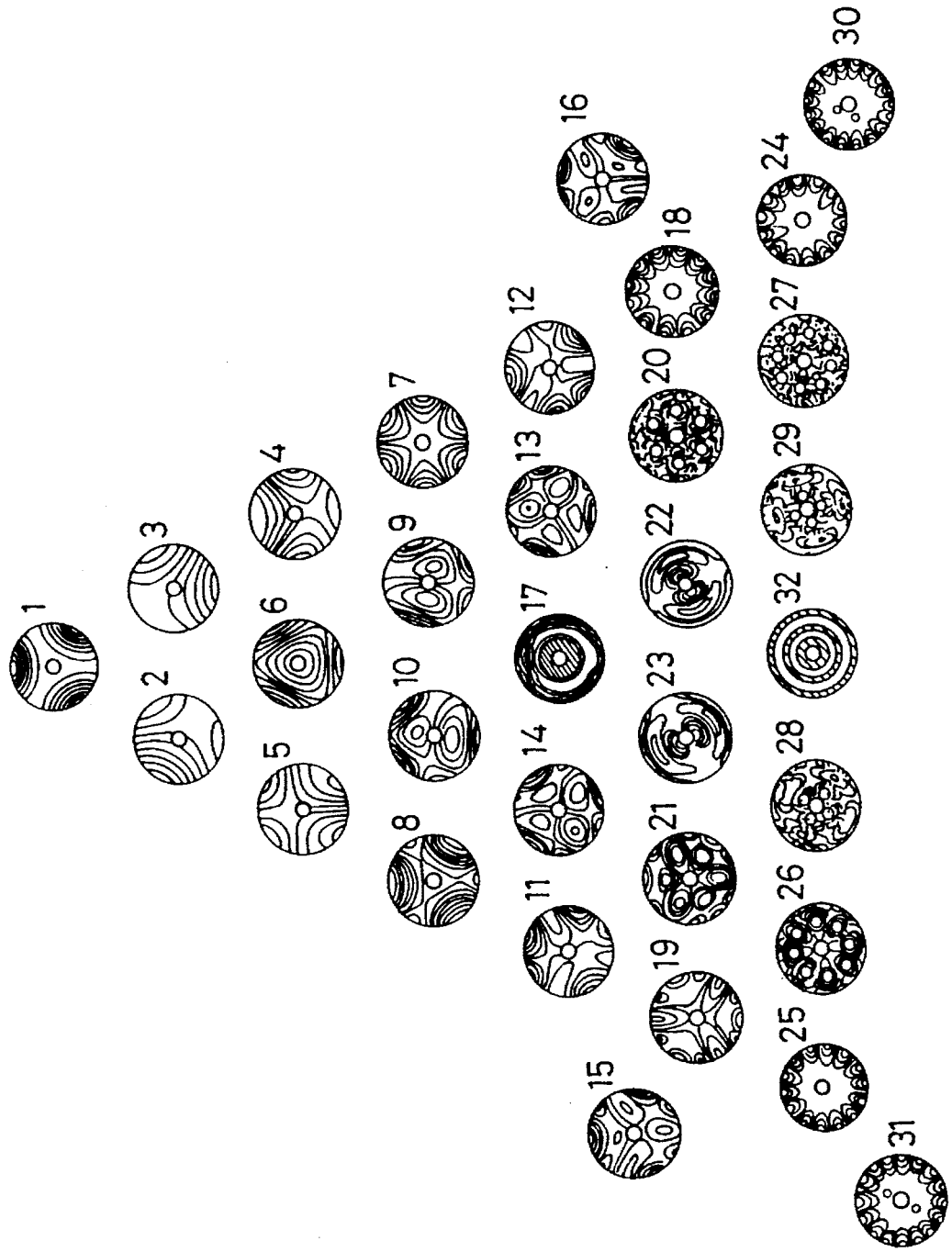
FIG. 14 is a contour-line diagram for showing examples of eigenoscillation mode of the reflector device.

FIG. 14 is a contour-line at the eigenoscillation mode of the reflector in which the three equi-distant points at outer edge are fixed. This can be got through a calculation by applying a finite element method in reference to a model of the reflector. A number allotted to each of the modes denotes a mode number and this has a characteristic that a spatial frequency is low in an order of low number and stiffness may be small. A mode having a low mode number is defined as a lower order mode and a mode having a large mode number is defined as a higher order mode. In this case, if a deformation pattern at the mode identified by a mode number (k) is expressed by $\phi_k(r, \theta)$ (in this case, r, $\theta$ are designated by polar coordinates at positions on the mirror surface), the mirror surface deformation $\phi(r, \theta)$ can be expressed by sum of each of the modes, i.e.

$$\phi(r, \theta) = \sum_{k=1}^{\infty} \{A_k \cdot \phi_k(r, \theta)\}$$

where, $A_k$ is a mode coefficient (corresponding to an amplitude of each of the modes). As the developing method, there are a method for calculating an inner product of each of the modes and a method for fitting with a method of least squares. As regards the eigenoscillation mode, since each of the modes is orthogonal to each other, any methods may produce essentially the same result.

As described above, lower order mode is less stiff and higher order mode is more stiff. Accordingly, higher order modes hardly occurs as compared with lower order modes, resulting in that their amplitudes are small. On the other hand, if a correcting force is calculated directly from a measured value of surface deformation, a fine pitch deformation i.e. higher modes are also applied as a correction target, resulting in that a large correcting force is required in order to correct them. An effect of correction, however, is small, since the amplitude of higher order modes is small. Due to this fact, if the deformation is developed into modes and the correction is carried out after selecting only major modes of deformation, an efficient correction can be performed with a small correcting force.

Figure 15:
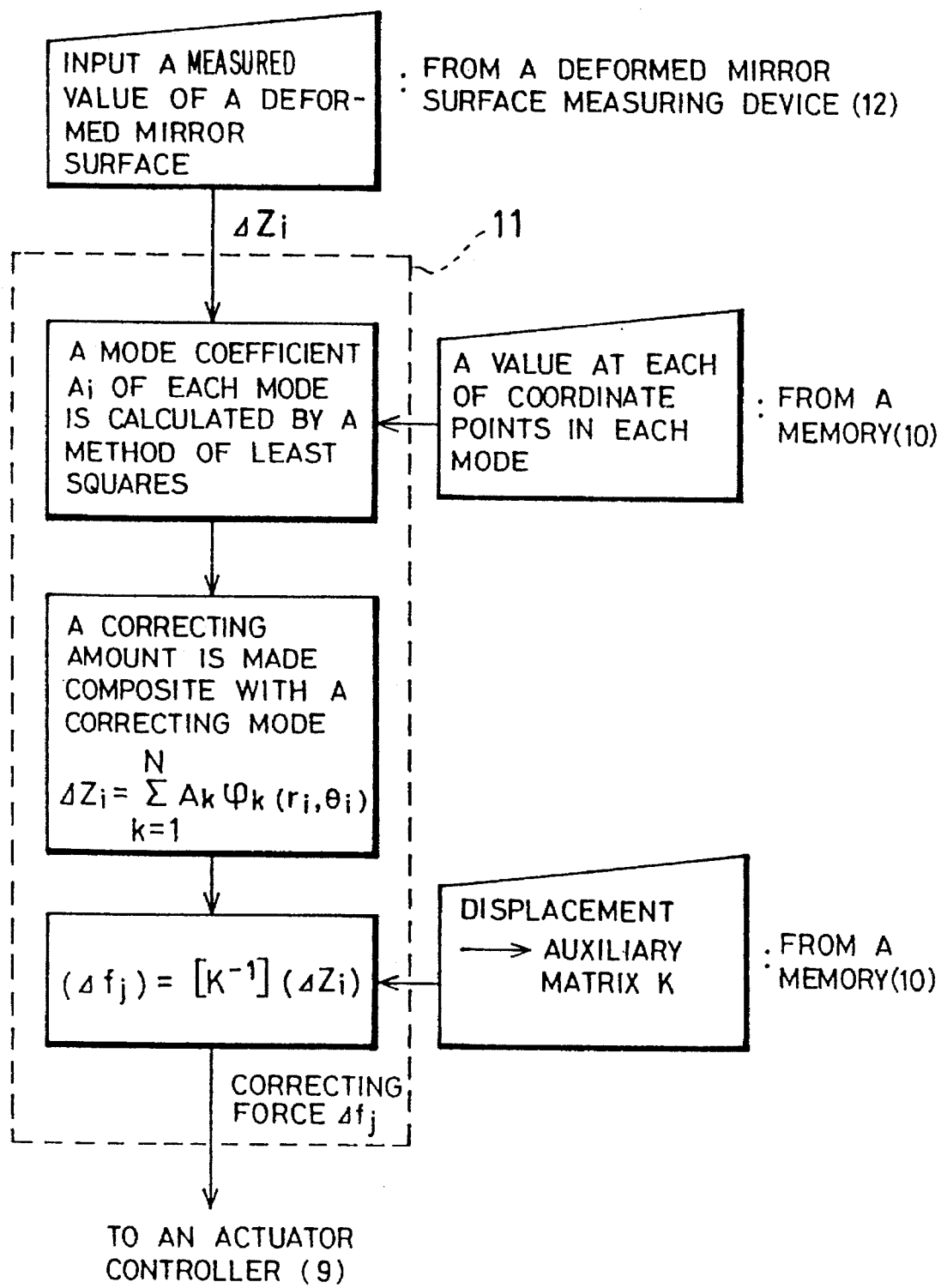
FIG. 15 is a flow chart for showing a processing at the processing part in the reflector device constructed in accordance with one embodiment of the present invention.

FIG. 15 is a flow chart for a processing at the processing part in the preferred embodiment of the present invention. In case of the eigenoscillation mode, since a mode pattern is not calculated in a form of function, so that it is calculated as a value at many surface points of the reflector and then it is stored in the memory together with the mode number and the coordinates. As the measured deformation data is input from the mirror surface deformation measuring device 12, the CPU 11 may call up the mode values from the memory 10 and calculate mode coefficients $A_k$ of the modes to be corrected by using a method of least squares. Then, the CPU 11 uses the mode coefficient $A_k$ and the mode value to calculate a target value for correction of deformation at each actuator point.

Assume now that the correction has been made from mode No. 1 to N, $A_k$ is first obtained up to k=1 to N, and then, the correction amount of deformation $\Delta Z_i$, i=1 \ldots, n at the $i^{th}$ actuator point are obtained as $$\Delta Z_i = \sum_{k=1}^{N} \{A_k \cdot \phi_k (r_i, \theta_i)\}$$

wherein $(r_i, \theta_i)$ is the coordinate at the actuator point i. $\Delta Z_i$ is one in which the higher order modes above N+1 order is removed from the actual deformation $\phi(r_i, \theta_i)$ The matrix $K^{-1}$ by which the correction amount of deformation $\Delta Z_i$ is converted into the correcting force $\Delta f_j$ is obtained in advance by the previously mentioned process and stored in the memory 10 of the processing part 8.

Accordingly, the CPU 11 of the processing part 8 calls the matrix $K^{-1}$ from the memory 10, multiply the matrix $K^{-1}$ and the aforesaid correction amount $Z_i$, i=1, . . . , n together to calculate the correcting force value for each actuator 5, which is output to the actuator controller 7.

The actuator controller 9 receives the correcting force values supplied from the CPU 11 and supplies the corresponding command value to the actuator 5. The actuator 5 produces the correcting force corresponding to the command value to apply the force to the reflector 3, of which deformation is corrected.

As described above, the modes to be corrected are selected so that the residual deformation is less than a predetermined designated amount, and then correction is applied. Therefore, the correction of high spatial frequency deformation is not carried out, and thus the force required for correction is small. Since the surface deformation is once developed into modes, even if some measured values are measured as an erroneous value due to the noise or the like, the amount of deformation can be substantially properly estimated and the proper correcting force can be calculated, thus providing an effect that a high precision mirror surface can be maintained. It is noted that deformations to be corrected include not only thermal deformation but also any deformations such as gravity deformation and so on.

What is claimed is:

1. A reflector device which is equipped with a reflector formed of three or more stacks arranged in arrays and bonded to each other, said stacks being classified into three groups including a first group having the highest thermal deformation based on average coefficient of linear expansion among all of the stacks in said three groups, a second group having a thermal deformation in the range of the median of all of the stacks in said three groups, and a third group having the smallest thermal deformation among all of the stacks in said three groups, said stacks of said second and third groups being arranged to surround each one of said stacks of said first group.

2. A reflector device which is equipped with a reflector formed of three or more stacks arranged in arrays and bonded to each other, said stacks being classified into three groups including a first group having the highest thermal deformation among said stacks based on thickness-wise variation rate of the coefficient of linear expansion, a second group having thermal deformation in the range of the median of all of the stacks in said three groups, and a third group having the smallest thermal deformation among all of the stacks in said three groups, said stacks of said second and third groups being arranged to surround each one of said stacks of said third group.

3. A reflector device which is equipped with a reflector formed of three or more stacks arranged in arrays and bonded to each other, said stacks being classified into three groups including a first group having the highest thermal deformation caused by inhomogeneity among said stacks both in average coefficient of linear expansion and in thickness-wise variation rate of the coefficient of linear expansion, a second group having thermal deformation in the range of the median of all of the stacks in said three groups, and a third group having the smallest thermal deformation among all of the stacks in said three groups, said stacks of said second and third groups being arranged to surround each one of said stacks of said first group.

* * * * *

UNITED STATES PATENT AND TRADEMARK OFFICE
CERTIFICATE OF CORRECTION

PATENT NO. : 5,461,514
DATED : October 24, 1995
INVENTOR(S) : Aki Sasaki et al.

It is certified that error appears in the above-indentified patent and that said Letters Patent is hereby corrected as shown below:

Col. 10, line 8, "eienoscillation" should be -- eigenoscillation --;
Col. 12, line 24 (claim 2), "third" should be -- first --; Col. 12, line 32 (claim 3), after "having" insert -- a --.

Signed and Sealed this

Twenty-seventh Day of February, 1996

*Attest:*

BRUCE LEHMAN

*Attesting Officer*         Commissioner of Patents and Trademarks